United States Patent
Ozaki et al.

(10) Patent No.: US 7,317,380 B2
(45) Date of Patent: Jan. 8, 2008

(54) VISUAL RECOGNITION SUPPORT SYSTEM

(75) Inventors: Noriyuki Ozaki, Kariya (JP); Hiroto Nakatani, Nagoya (JP); Teiyuu Kimura, Nagoya (JP); Minoru Makiguchi, Toyota (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 11/183,933

(22) Filed: Jul. 19, 2005

(65) Prior Publication Data

US 2006/0017548 A1 Jan. 26, 2006

(30) Foreign Application Priority Data

Jul. 26, 2004 (JP) ............... 2004-217850
Dec. 16, 2004 (JP) ............... 2004-364997

(51) Int. Cl.
*B60Q 1/00* (2006.01)

(52) U.S. Cl. .......... 340/425.5; 340/469; 362/464

(58) Field of Classification Search ........ 340/425.5, 340/465, 469; 362/464, 465
See application file for complete search history.

(56) References Cited

U.S. PATENT DOCUMENTS

| | | | | |
|---|---|---|---|---|
| 5,536,975 A | * | 7/1996 | Jennings | 340/469 |
| 5,707,129 A | * | 1/1998 | Kobayashi | 362/464 |
| 5,896,085 A | * | 4/1999 | Mori et al. | 340/469 |
| 6,049,749 A | * | 4/2000 | Kobayashi | 340/469 |
| 6,429,594 B1 | * | 8/2002 | Stam et al. | 340/469 |
| 6,726,349 B2 | * | 4/2004 | Uchida | 362/464 |
| 6,774,988 B2 | * | 8/2004 | Stam et al. | 340/469 |
| 6,919,820 B2 | * | 7/2005 | Makita et al. | 362/464 |
| 7,092,007 B2 | * | 8/2006 | Eguchi et al. | 340/425.5 |

FOREIGN PATENT DOCUMENTS

JP  A-2000-203335  7/2000

OTHER PUBLICATIONS

Hidaka et al. "Functional stochastic resonance in the human brain: Noise induced sensitization of baroreflex system". Transaction on Bionics and Physiology. Symposium vol. 15, 2000, pp. 261-264. (discussed on pp. 2 and 7 in the specification).

* cited by examiner

*Primary Examiner*—John Tweel, Jr.
(74) *Attorney, Agent, or Firm*—Posz Law Group, PLC

(57) ABSTRACT

A visual recognition support system includes a noise area determination function for determining a noise area where a visual noise is output to improve sensitivity of visual recognition of an object in need of attention of an operator of a vehicle. The intensity of the visual noise is determined based on a threshold of the visual perception.

19 Claims, 6 Drawing Sheets

VISUAL NOISE
(BRIGHTNESS BELOW THRESHOLD)

VISUAL RECOGNITION SUPPORT SYSTEM

CROSS REFERENCE TO RELATED APPLICATION

This application is based on and claims the benefit of priority of Japanese Patent Application No. 2004-217850 filed on Jul. 26, 2004, and Japanese Patent Application No. 2004-364997 filed on Dec. 16, 2004, the disclosure of which is incorporated herein by reference.

FIELD OF THE INVENTION

The present invention generally relates to a visual recognition support system for visually assisting a driver of a vehicle.

BACKGROUND OF THE INVENTION

In recent years, a headlight control system for assisting a driver of a vehicle to recognize an object such as a pedestrian or the like without alerting the pedestrian has been proposed (refer to Japanese Patent Document JP-A-2000-203335). In the disclosure of this Japanese Patent Document, the headlight control system includes a first headlight for projecting a visible light toward a front space of the vehicle and a second headlight for projecting an ultraviolet light toward a front space of the vehicle. The ultraviolet light projected from the second headlight shines on clothes worn by the pedestrian, and reflects back toward the driver of the vehicle. That is, the pedestrian is lit up by the ultraviolet light. Therefore, the driver of the vehicle can visually recognize the pedestrian ahead of the vehicle, and the pedestrian is not alerted by the ultraviolet light even when he/she sees the ultraviolet light from the second headlight.

However, reflection intensity of the ultraviolet light used in the conventional headlight control system is affected by the color and material of the clothes of the pedestrian. That is, the intensity of the reflection of the ultraviolet light varies largely depending on the color of the clothes or the like. In addition, the driver can hardly recognize a small animal such as a dog, a cat or the like that may be lit up by the ultraviolet light because their coats are not very reflective.

SUMMARY OF THE INVENTION

In view of the above-described and other problems, it is an object of the present invention to provide a visual recognition support system for assisting a driver of a vehicle in recognizing an object ahead of the vehicle.

The visual recognition support system of the present invention generates visual noise having an optimum intensity based on a threshold for enabling visual recognition of an object. The visual recognition support system uses a noise area determination function for identifying an area, which hereinafter is referred to as the noise area, within a field of vision of the driver to position the generated noise.

The present invention is based on a research result regarding "Stochastic Resonance (SR)," disclosed in a thesis entitled "Functional stochastic resonance in the human brain: Noise induced sensitization of baroreflex system" by Hidaka et al., and published in Transaction on Bionics and Physiology Symposium Vol. 15, pp 261-264.

Stochastic resonance (SR) is a phenomenon that improves sensitivity of perception by statistically manipulating a small noise having an intensity below a threshold of perception for an organ of interest such as an eye, an ear or the like. Thus, SR is studied for improving human perception or a similar macro function. The area of improvement may include any macro facility such as perception, nerve control, behavioral operation or the like.

SR is more practically explained with reference to the drawings. FIG. 9A shows an illustration of a human sensory system (e.g., a nerve cell) having a non-linear function. The human sensory system generally responds to an input having an intensity greater than a threshold by yielding an output, as shown in FIG. 9B. Therefore, an input having an intensity below the threshold cannot be detected. Therefore, one aspect of the present invention implements SR to generate random noise having a broad frequency band increase the magnitude of the input and effectively improve the sensitivity of the human sensory system to detect an otherwise un-perceptible input. However, an intensity of the random noise for improving the sensitivity should be carefully chosen in terms of its intensity. FIG. 9C shows a relationship between a signal to noise ratio (SNR) and the random noise intensity. The relationship shown in the figure indicates that the random noise should neither be too strong nor too weak for the signal of interest to be perceived. That is, a certain intensity of the random noise, i.e., an optimum intensity, will maximize the SNR.

An aspect of the present invention generates this random noise having the optimum intensity, and places it in the driver's field of vision by using the noise area determination function, as stated above. In this manner, the driver's attention is drawn to the noise area, which includes the object.

The noise area determination function may further include an object detection function for detecting the object ahead of the vehicle and an eye position detection function for detecting a position of the driver's eye.

Furthermore, the position of the noise area may be determined to be somewhere on a line that is drawn from the driver's eye toward the detected object. Therefore, the noise area may be positioned on the ground behind the object, or on the windshield between the driver's eye and the object.

Additionally, the object detection function may identify the object as being a pedestrian, an obstacle or the like.

Furthermore, the noise area may include the area around the detected object, i.e., a circular area having a radius of several meters around the object.

The visual recognition support system of another aspect of the present invention may also have a vehicle condition detection function for detecting a condition of the vehicle. The condition detected by the vehicle condition detection function may include a rotation angle of the steering wheel, an opening angle of a throttle, a brake pressure, a shift position, a condition of a turn signal, the speed of the vehicle, the traveling lane of the vehicle and the like. A more general condition of the vehicle may be predicted to a certain extent based on information on these conditions. That is, for example, the turn signal signaling a right turn and the rotation angle of the steering wheel being in a certain right angle indicate that the vehicle is turning right.

The condition of the vehicle may further be utilized for determining the position of the noise area, i.e., the area that should draw the attention of the driver. For example, the driver of the vehicle should and does direct his/her attention to a right front space ahead of the vehicle when the vehicle is turning right.

In this manner, the position of the noise area is determined based on the condition of the vehicle. As a result, the perception of the driver, that is, visual recognition of the object by the driver, is improved when the driver is focusing his/her attention on the object.

In another aspect of the present invention, the position of the eye of the driver may be detected for precisely determining the position of the noise area. The eye of the driver may further be examined in terms of the direction of sight. In this manner, information on the position and the direction of the eye of the driver may be used to adjust the position of the noise area for a different driver and/or for a different position of the driver based on an adjustment of the seat slider position and/or a seat back angle.

The visual recognition support system of one embodiment of the present invention uses a headlight for generating the visual noise. The intensity of the visual noise may be controlled by adjusting, for example, the brightness of the headlight. The visual noise generated in this manner is delivered to the driver's field of vision.

The visual noise generated in the visual recognition support system is controlled through adjusting the brightness and a direction of the headlight. FIG. 4 shows an embodiment of a headlight. A shade 10 (a first shade), which is conventionally used to limit a high beam. The shade is used to control the brightness and the direction of a lamp 20 through the adjustment of the transparency and the like. In this manner, the visual noise may be placed on a far side of a visible light from the headlight when the visible light and the visual noise are projected on the ground ahead of the vehicle as shown in FIG. 4.

In another aspect of the present invention, the visual noise of the visual recognition support system may be generated by a random emission of light from the headlight. FIG. 13 shows an embodiment of a pattern of the random emission of light from the headlight.

In yet another aspect of the present invention, the visual noise produced by the visual recognition support system may be generated by emitting light from a window on a periphery of the shade. The window of the shade may be obstructed by another shade (a second shade) for randomly emitting light. That is, the window of the first shade is used to project the light toward the far side of the visible light, and the second shade having a slit or the like is used to randomly obstruct the emitted light through the window of the first shade. The second shade may further be moved along an axis of the headlight, or may be rotatably moved around the axis. In this manner, the light from the headlight may be randomly obstructed. FIGS. 10 to 12 show an embodiment of the present invention regarding the random emission of the light.

In still another aspect of the present invention, the visual noise of the visual recognition support system may be displayed in a display area on the windshield of the vehicle for improved perception. In this manner, the visual recognition support system can deliver the visual noise toward the driver of the vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

A first embodiment of the present invention is explained with reference to the drawings.

Figure 1:
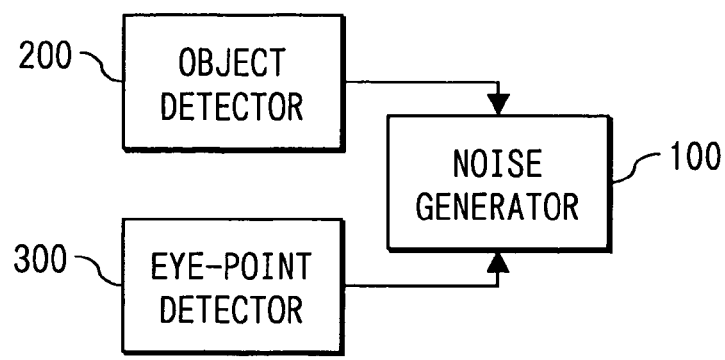
FIG. 1 is a block diagram of a visual recognition support system in a first embodiment of the present invention.

FIG. 1 shows a block diagram of a visual recognition support system in a first embodiment of the present invention. The visual recognition support system includes a noise generator 100, an object detector 200 and an eye-point detector 300.

The visual recognition support system is devised based on a research thesis having a title "Functional stochastic resonance in the human brain: Noise induced sensitization of baroreflex system" by Hidaka et al., in Transaction on Bionics and Physiology Symposium Vol. 15, pp 261-264.

Stochastic resonance (SR) is a phenomenon that improves sensitivity of perception by statistically manipulating a small noise having an intensity below a threshold of perception for an organ of interest such as an eye, an ear or the like. Thus, SR is studied for improving human perception or a similar macro function. The area of improvement may include any macro facility such as perception, nerve control, behavioral operation or the like.

Figure 9A:
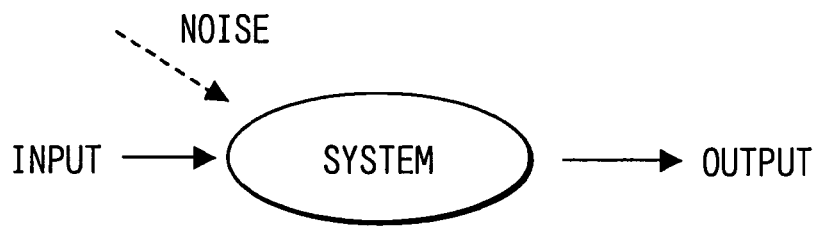
FIG. 9A is a block diagram of a human sensory system.
Figure 9B:
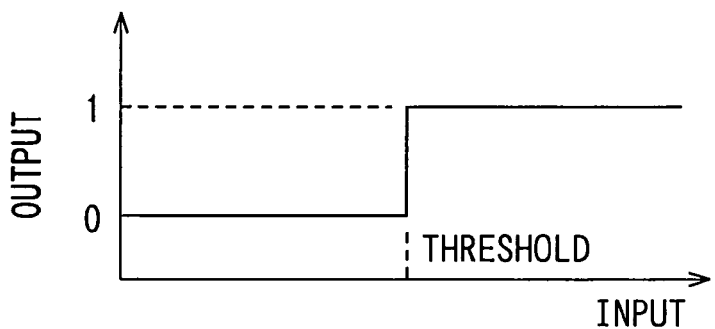
FIG. 9B is a diagram showing a relationship of an input-output characteristic having a threshold.
Figure 9C:
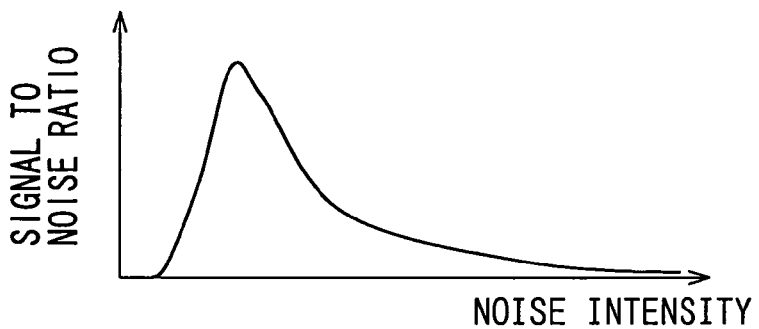
FIG. 9C is a diagram of the visual noise showing a relationship between a signal to noise ratio and a noise intensity.

SR is more practically explained with reference to the drawings. FIG. 9A shows an illustration of a human sensory system (e.g., a nerve cell) having a non-linear function. The human sensory system generally responds to input having an intensity greater than a threshold by yielding an output, as shown a in FIG. 9B. Therefore, an input having an intensity below the threshold cannot be detected. Therefore, one aspect of the present invention implements SR to generate random noise having a broad frequency band increase the magnitude of the input and effectively improve the sensitivity of the human sensory system to detect an otherwise un-perceptible input. However, an intensity of the random noise for improving the sensitivity should be carefully chosen in terms of its intensity. FIG. 9C shows a relationship between a signal to noise ratio (SNR) and the random noise intensity. The relationship shown in the figure indicates that the random noise should neither be too strong nor too weak for the signal of interest to be perceived. That is, a certain intensity of the random noise, i.e., an optimum intensity, will maximize the SNR.

The present embodiment of the invention generates this random noise having the optimum intensity, and places it in the driver's field of vision by using the noise area determination function, as stated above.

The object detector 200 shown in FIG. 1 detects an object such as a pedestrian, another vehicle or the like in need of attention of a driver of a subject vehicle. The object detector 200 may use a radar device having an infrared light, a laser light, a millimetric wave, a micro wave or the like for detecting the object.

The eye-point detector 300 detects a position of an eye (eye-point). The eye-point detector 300 uses a camera or the like to detect an eye-point by analyzing a captured image by the camera.

Figure 2:
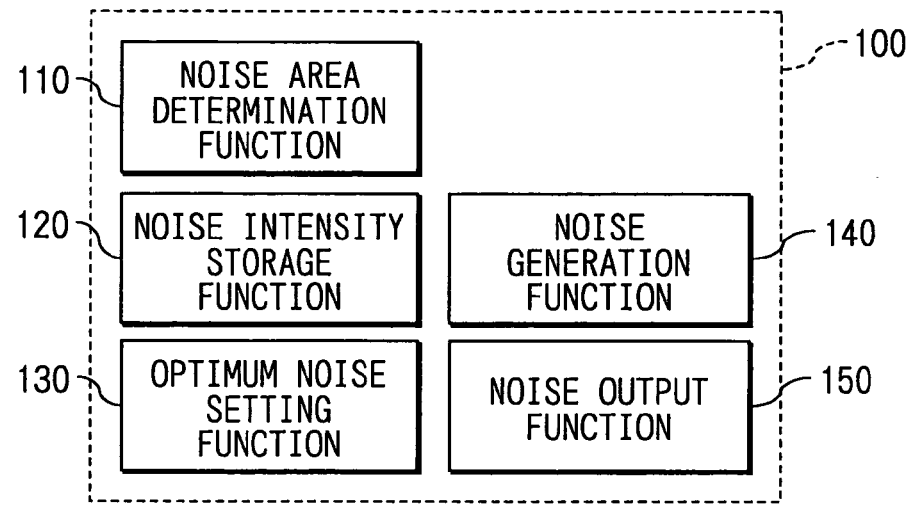
FIG. 2 is a block diagram of a noise generator in the first embodiment.

The noise generator 100 includes a noise area determination function 110, a noise intensity storage function 120, an optimum noise setting function 130, a noise generation function 140 and a noise output function 150 as shown in a block diagram in FIG. 2.

The noise area determination function 110 determines a noise area, that is an area defined by the eye-point detected by the eye-point detector 300 and the object detected by the object detector 200.

The noise area determination function 110 determines the noise area on a line drawn from the eye-point toward the detected object to determine the noise area in a sight of the driver who watches the object. The noise area determination function 110 determines the noise area to be on a ground behind the object or on a windshield between the eye-point and the object. The noise area may include the area around the detected object, i.e., a circular area having a radius of several meters around the object.

The noise area determination function 110 includes a function that re-determines the noise area based on a change in the eye-point of the driver. In this manner, information on the position and the direction of the eye of the driver may be used to adjust the noise area for a different driver and/or for a different position of the driver caused by an adjustment of the seat slider position and a seat back angle.

The noise intensity storage function 120 stores a threshold of a noise intensity. The noise intensity storage function 120 stores different types of the thresholds, such as the threshold of the noise intensity of a random noise that has an even intensity distribution of the visual noise over a frequency band, or the threshold of the noise intensity of a 1/f noise that has an inversely proportional intensity distribution to a frequency of the visual noise.

The visual noise used to induce SR has randomness over a broad frequency band, that is, the visual noise that does not have any specific frequency on which the intensity of the visual noise steeply increases or decreases.

Therefore, the random noise having the even intensity distribution or the 1/f noise having the inversely proportional intensity distribution are used to induce the stochastic resonance. The noise intensity storage function 120 stores different types of thresholds of the noise intensity for the purpose of reference for the driver.

The threshold of the noise intensity is determined as an intensity that is recognized by the driver when the noise intensity is gradually increased in an output from the noise output function 150.

The optimum noise setting function 130 sets an optimum intensity of a random noise. For example, the optimum intensity of the random noise is determined as a predetermined intensity of the threshold of the random noise. The optimum intensity of the random noise may be approximately 100% of the threshold of the perceptible noise intensity of the random noise, and the optimum intensity of the 1/f noise may be approximately 69% of the threshold of the perceptible noise intensity of the random noise.

Ratio of the optimum intensity against the threshold of the noise intensity may be changed. The ratio of the optimum intensity may be determined by experiments or the like in advance for use in production.

The noise generation function 140 generates the visual random noise or the visual 1/f noise based on the optimum intensity set by the optimum noise setting function 130.

Figure 3:
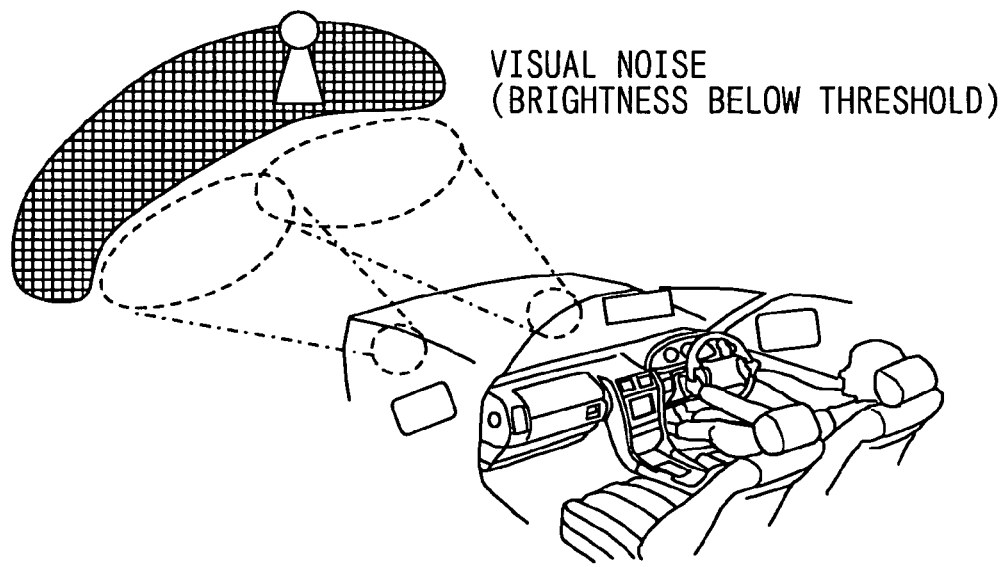
FIG. 3 is a perspective view of a visual noise projected toward a space ahead of a vehicle.

The noise output function 150 is used to deliver the visual noise to the driver of the vehicle. The noise output function 150 uses a light emitted from a headlight to output the visual noise in the present embodiment. The visual noise is generated, for example, by altering a characteristic of the light (e.g., brightness) as shown in FIG. 3. As a result, the visual noise is generated as a noise having brightness below a standard intensity.

Figure 4:
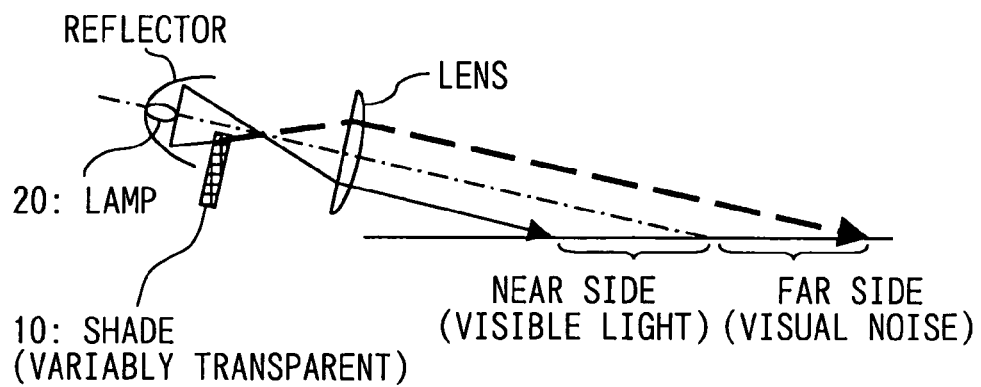
FIG. 4 is a cross-sectional view of a headlight used for generating the visual noise.

FIG. 4 shows a cross-sectional view of a headlight used for generating the visual noise. A shade 10 (a first shade), which is conventionally used to limit a high beam, is used to control the brightness and a light axis of a lamp 20 through the adjustment of the transparency and the like in the present embodiment. In this manner, the noise area of the visual noise may be placed on a far side of a visible light from the headlight projected on the ground. The brightness and the axis are controlled based on a control signal from the noise generation function 140.

Figure 5:
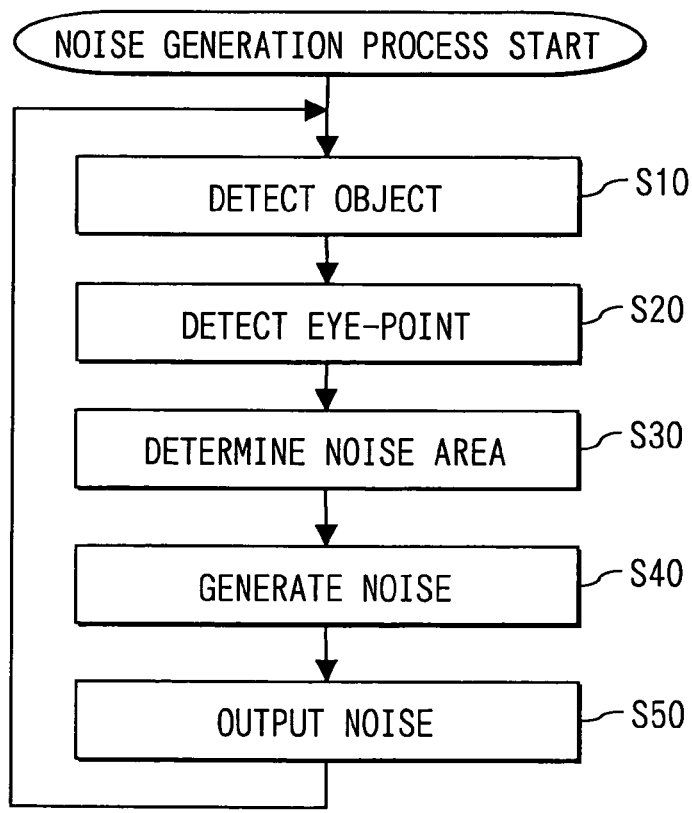
FIG. 5 is a flowchart of a noise generation process in the first embodiment.

A noise generation process of the visual recognition support system in the present embodiment is explained with reference to a flowchart in FIG. 5.

In step S10, the object in need of attention of the driver is detected by the visual recognition support system when the system is turned on.

In step S20, the eye-point of the driver is detected. In step S30, the ground behind the object is determined as the noise area on which the visual noise is outputted.

In step S40, the control signal is generated to control the shade 10 for outputting the visual noise having the optimum intensity that is determined by the optimum noise setting function 130. In step S50, the shade 10 is controlled based on the control signal generated in step S40 to output the visual noise in the noise area. The visual noise is continuously generated by repeating the steps S10 to S50.

The visual recognition support system in the present invention outputs the visual noise in the noise area for assisting the driver of the vehicle to recognize the object in the above-described manner. The visual recognition of the object in need of the attention of the driver is improved by SR induced by the visual noise from the visual recognition support system.

The noise output function 150 of the first embodiment generates the visual noise by randomly emitting the light in a form of a modified embodiment (first modification). This is different from the visual noise generated by controlling the brightness and the light axis, as shown in FIG. 4, in the first embodiment.

Figure 10:
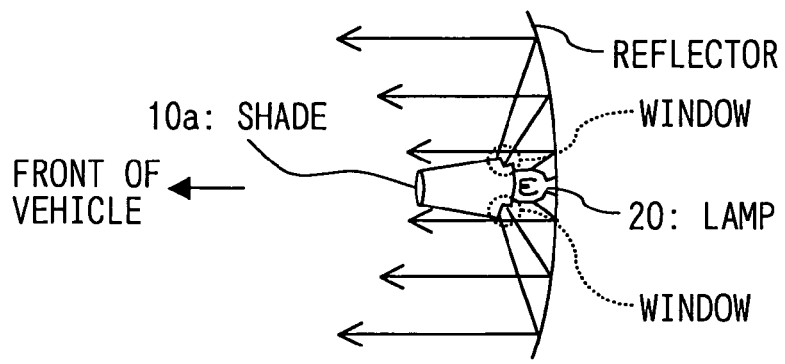
FIG. 10 is a cross-sectional view of the headlight used in the first embodiment.

FIG. 10 shows a cross-sectional view of the headlight used in a first modification of the first embodiment. The lamp 20 is covered by a shade 10a, and the shade 10a has a window on its periphery. The light from the lamp 20 passes through the window on the shade 10a and reflects on a reflector to be projected toward a space ahead of the vehicle.

Figure 13:
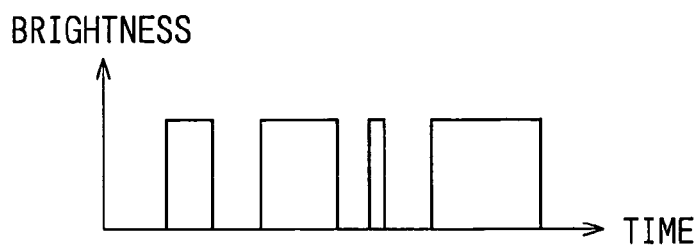
FIG. 13 is a diagram of an emission pattern of the visual noise in the first embodiment.

The first modification of the first embodiment intermittently obstructs the light emitted from the lamp 20. That is, the light may be intermittently turned on according to a predetermined timing pattern as shown in FIG. 13. In this manner, the visual noise is outputted by using the light from the headlight.

Figure 11:
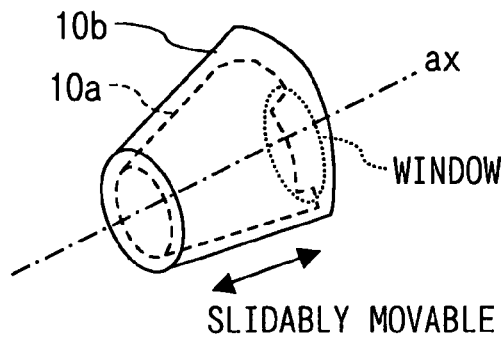
FIG. 11 is a perspective view of a first shade covered by a second shade in the first embodiment.
Figure 12:
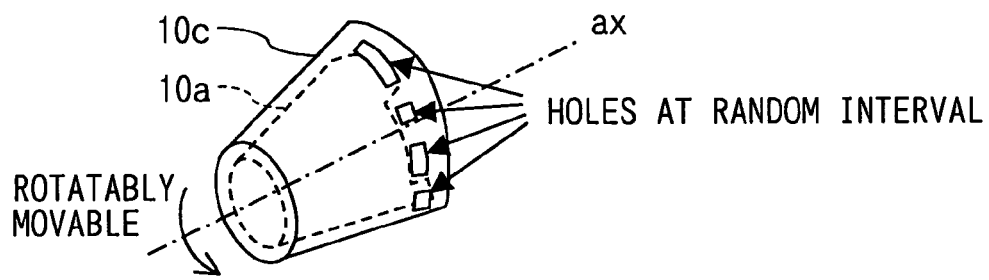
FIG. 12 is a perspective view of the first shade covered by a second shade having randomly arranged windows in the first embodiment.

The light from the window of the shade 10a may be obstructed in a manner shown in FIGS. 11 and 12. A shade 10b covers the shade 10a in FIG. 11. In this case, the shade 10b is slidably moved along its axis (ax) back and forth by using a motor or the like (not shown in the figure). The window on the shade 10a is intermittently exposed from the shade 10b by the movement of the shade 10b. In this manner, the light is emitted intermittently from the window of the shade 10a.

A shade 10c in FIG. 12 covers the shade 10a. The shade 10c has randomly spaced holes on its periphery. The shade 10c is rotated on its axis (ax) by a motor or the like (not shown in the figure). The light from the window on the shade 10a is emitted from the random holes on the shade 10a in this manner.

Figure 14:
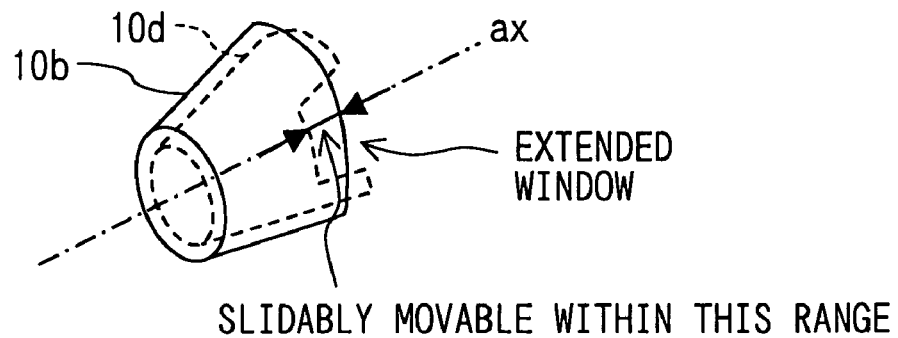
FIG. 14 is a perspective view of the first shade covered by the second shade in the first embodiment.
Figure 15:
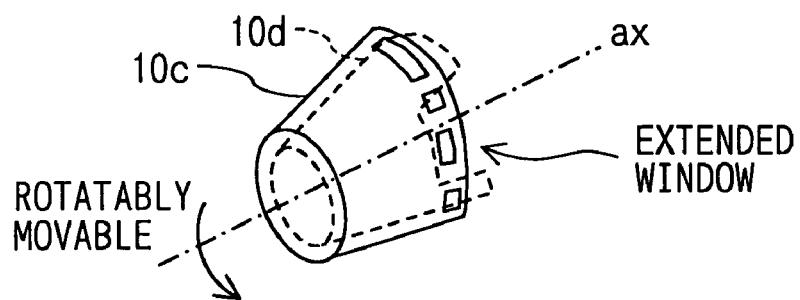
FIG. 15 is a perspective view of the first shade covered by the second shade in the first embodiment.

A shape of the window should be carefully chosen in order to extend the noise area toward the far side of the visible light projected on the ground. The shade 10c in FIG. 14 or a shade 10d in FIG. 15 may have the window extended toward a front of the vehicle when the noise area extends toward the far side of the visible light projected on the ground.

The noise area may be projected on the windshield of the vehicle to be overlaid on a background scenery for viewing by the driver instead of the noise area projected on the ground in the first embodiment. The visual recognition support system in a second modification of the first embodiment delivers the visual noise by having a display area for displaying the visual noise on the windshield. The visual noise generated through controlling the brightness of the light or the like is delivered to the driver from the display area for inducing SR to improve perception of an otherwise un-recognizable object.

Second Embodiment

A second embodiment of the present invention is described with a focus on differences of characteristics from the first embodiment.

The first embodiment of the visual recognition support system determines the noise area on a line drawn from the eye-point to the object of attention. The visual recognition support system in the present embodiment determines the noise area based on a condition of the subject vehicle.

That is, the condition of the subject such as a rotation angle of the steering wheel, an opening angle of a throttle, a brake pressure, a shift position, a condition of a turn signal, the speed of the vehicle, the traveling lane of the vehicle and the like is used to predict a behavior of the vehicle. The subject vehicle is expected to turn right when the turn signal is signaling a right turn and the detected rotation angle of the steering wheel is to the right from a neutral position.

The area in need of the driver's attention may be predicted based on information of the condition of the vehicle. The driver of the vehicle that is turning right, for example, directs his/her attention toward a right front space of the vehicle. Therefore, the noise area determined by the information of the condition of the vehicle is used as a destination of the visual noise in the present embodiment.

Figure 6:
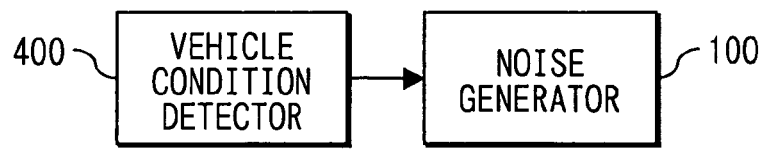
FIG. 6 is a block diagram of the visual recognition support system in a second embodiment.

FIG. 6 shows a block diagram of the visual recognition support system in the present embodiment. The visual recognition support system includes the noise generator 100 and a vehicle condition detector 400.

The vehicle condition detector 400 includes various types of sensors (not shown in the figure) for detecting the rotation angle of the steering wheel, the opening angle of the throttle, the brake pressure, the shift position, the condition of the turn signal, the speed of the vehicle, the traveling lane of the vehicle and the like.

Figure 7:
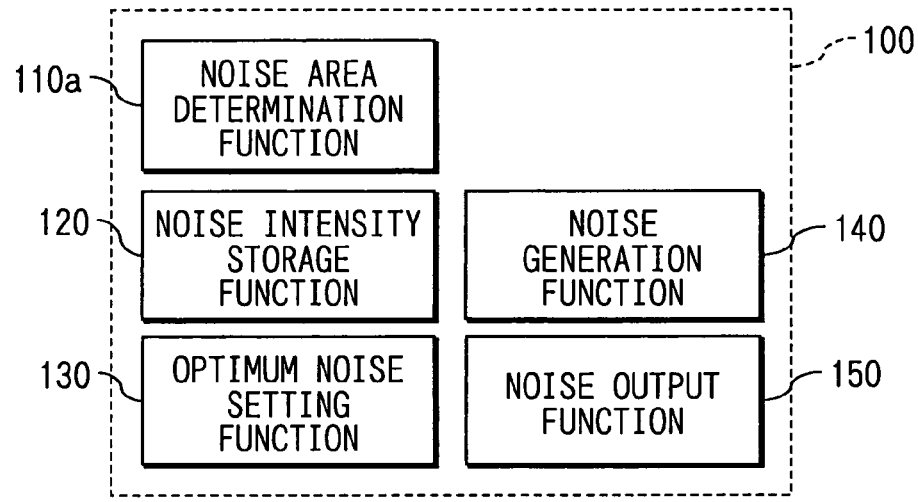
FIG. 7 is a block diagram of a noise generator in the second embodiment.

The noise generator 100 includes a noise area determination function 110a, the noise intensity storage function 120, the optimum noise setting function 130, the noise generation function 140 and the noise output function 150 as shown in FIG. 7. The functions except for a noise area determination function 110a are same as the functions in the first embodiment. Therefore, the noise area determination function 110a is mainly explained in this embodiment.

The noise area determination function 110a determines the noise area based on the condition of the subject vehicle detected by the vehicle condition detector 400. The noise area is determined with consideration of the eye-point of the driver detected by the eye-point detector (not shown in the figure). In this manner, an eye-point of a different driver may be input to the visual recognition support system for generating the visual noise.

Further, the noise area determination function 110a re-determines the noise area based on a change in the eye-point of the driver. In this manner, information on the position and the direction of the eye of the driver may be used to adjust the noise area for the different driver and/or for a different position of the driver caused by an adjustment of the seat slider position and/or a seat back angle.

Figure 8:
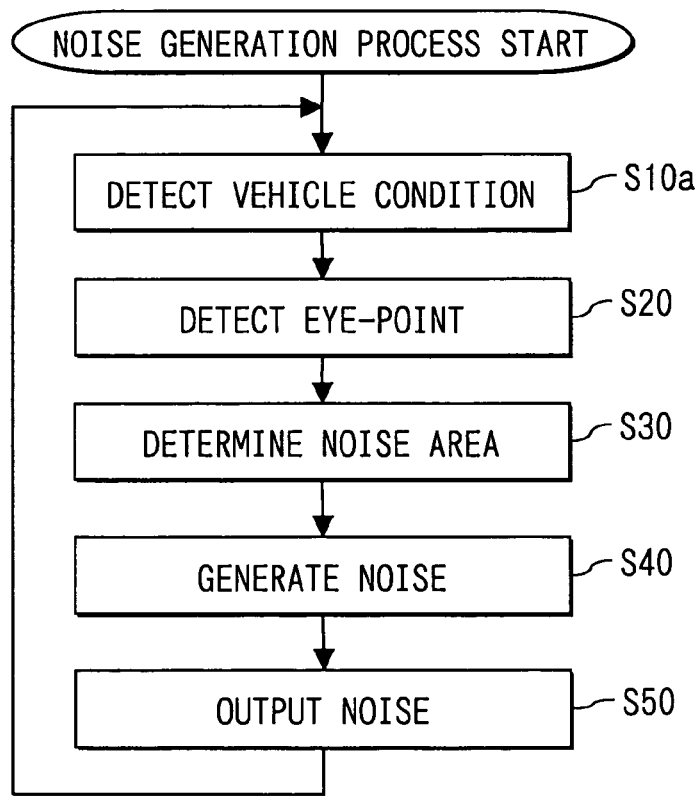
FIG. 8 is a flowchart of a noise generation process in the second embodiment.

A flowchart of the noise generation process in the present embodiment is shown in FIG. 8. The process starts with step S10a when the visual recognition support system is turned on. In step S10a, the traveling condition of the subject vehicle is detected. In steps S20 to S50, the process proceeds in a same manner as the first embodiment. Explanation of these steps is omitted.

The visual recognition support system in the present embodiment determines the noise area based on the traveling condition of the subject vehicle for outputting the visual noise. In this manner, the visual recognition support system improves visual recognition in the noise area that is determined to be having driver's attention by SR induced by the generated visual noise.

Although the present invention has been fully described in connection with the preferred embodiments thereof with reference to the accompanying drawings, it is to be noted that various changes and modifications will become apparent to those skilled in the art.

What is claimed is:

1. A visibility support apparatus having a noise generation function for delivering a visual noise to a vision of an operator of a vehicle in an intensity, the apparatus comprising:

a noise positioning means for positioning the visual noise in the vision of the operator watching an object in the vision of the operator, wherein the visual noise is output to the position determined by the noise positioning means, and the intensity of the visual noise is determined so that the visual noise facilitates visual recognition of the object, wherein the noise positioning means further comprising:

an object detection means for detecting the object; and an eye position detection means for detecting a position of an eye of the operator,
wherein the noise positioning means determines the position of the visual noise on a straight line that is defined by the respective positions of the eye and the object.

2. A visibility support apparatus having a noise generation function for delivering a visual noise to a vision of an operator of a vehicle in an intensity, the apparatus comprising:
a vehicle condition detection means for detecting a condition of the vehicle;
a noise positioning means for positioning the visual noise in a vision of the operator watching an object based on the condition of the vehicle detected by the vehicle condition detection means; and
an eye position detection means for detecting a position of an eye of the operator,
wherein the visual noise is output to the position determined by the noise positioning means,
wherein the noise positioning means determines the position of the visual noise based on the position of the eye and a position of the object, and
the intensity of the visual noise is determined so that the visual noise facilitates visual recognition of the object.

3. The visibility support apparatus according to claim 2, wherein the noise positioning means changes the position of the visual noise when the position of the eye has changed.

4. The visibility support apparatus according to claim 3 further comprising a noise generation means for generating the visual noise,
wherein the noise generation means uses a light emitted from a headlight for generating the visual noise.

5. The visibility support apparatus according to claim 4, wherein the noise generation means controls a direction of an axis of the light emitted from the headlight and a luminous intensity of the light emitted from the headlight.

6. The visibility support apparatus according to claim 4, wherein the noise generation means emits the visual noise in an arbitrarily determined pattern.

7. The visibility support apparatus according to claim 6, wherein the light from the headlight is emitted through a window on a periphery of a light shade to form a beam, and
the noise generation means uses the light shade to intermittently obstruct the light according to the arbitrarily determined pattern.

8. The visibility support apparatus according to claim 7, wherein the light from the headlight is obstructed in a front space of the light shade.

9. The visibility support apparatus according to claim 7 further comprising:
a covering shade disposed in a front space of the light shade for covering a window in the periphery of the light shade,
wherein the covering shade is slidably moved along the axis of the light to obscure the light from the headlight through the window.

10. The visibility support apparatus according to claim 7, wherein the covering shade has a plurality of arbitrarily placed openings in an area corresponding to the window on the periphery of the light shade, and the covering shade rotates around the axis of the light to obstruct the light.

11. A method for improving visual recognition of an object by an operator of a vehicle through adding a visual noise to a vision of the operator comprising the steps of:
detecting a position of the object in a space ahead of the vehicle;
detecting a position of an eye of the operator;
determining a noise area in the vision of the operator based on the position of the object and the position of the eye;
generating the visual noise in an intensity; and
outputting the visual noise in the vision of the operator,
wherein the intensity of the visual noise is determined based on a threshold of the visual noise for facilitating visual recognition of the object.

12. A method for improving visual recognition of an object by an operator of a vehicle through adding a visual noise to a vision of the operator comprising the steps of:
detecting a condition of the vehicle;
detecting a position of the object in a space ahead of the vehicle;
detecting a position of an eye of the operator;
determining a noise area in the vision of the operator based on the condition of the vehicle, the position of the object and the position of the eye;
generating the visual noise in an intensity; and outputting the visual noise in the vision of the operator,
wherein the intensity of the visual noise is determined based on a threshold of the visual noise for facilitating visual recognition of the object.

13. The method according to claim 12, wherein the visual noise is generated by a light emitted from a headlight of the vehicle.

14. The method according to claim 13, wherein the visual noise is generated by controlling a direction of an axis of the light and luminous intensity of the light.

15. The method according to claim 13, wherein the visual noise is generated in an arbitrarily determined pattern of interval.

16. The method according to claim 15 further comprising a step of providing a light shade disposed in a space in front of the headlight,
wherein the light is emitted through a window on a periphery of the light shade to form a beam, and
the light is intermittently obstructed by the light shade according to an arbitrarily determined pattern.

17. The method according to claim 16 further comprising a step of providing a covering shade in a space in front of the light shade,
wherein the light is emitted by controlling a relative position of the covering shade to the light shade.

18. The method according to claim 17, wherein the covering shade has arbitrarily spaced light emission windows on a periphery.

19. The method according to claim 12 further comprising a step of providing a display area on a windshield of the vehicle for displaying an image in the vision of the operator,
wherein the visual noise is outputted in the display area.

* * * * *